US007796520B2

(12) United States Patent
Poustchi et al.

(10) Patent No.: US 7,796,520 B2
(45) Date of Patent: Sep. 14, 2010

(54) SYSTEM AND METHODS FOR ANNOUNCING AND LOCATING SERVICES IN A DISTRIBUTED PEER-TO-PEER NETWORK

(75) Inventors: Behrouz Poustchi, Ottawa (CA); Eric Cooper, Kanata (CA); James A. Stelzig, Gatineau (CA)

(73) Assignee: Avaya Canada Corp., Halifax, Nova Scotia (CA)

( * ) Notice: Subject to any disclaimer, the term of this patent is extended or adjusted under 35 U.S.C. 154(b) by 1734 days.

(21) Appl. No.: 10/952,857

(22) Filed: Sep. 30, 2004

(65) Prior Publication Data
US 2006/0067249 A1 Mar. 30, 2006

(51) Int. Cl.
*H04L 12/26* (2006.01)
(52) U.S. Cl. ........................ 370/236; 370/400; 709/237
(58) Field of Classification Search ......... 370/352–356, 370/360, 235, 236, 310, 391, 400; 709/205, 709/223–226, 212, 231, 232, 236, 237
See application file for complete search history.

(56) References Cited

U.S. PATENT DOCUMENTS

| 5,963,620 | A | 10/1999 | Frankel et al. ........... 379/93.05 |
| 6,604,140 | B1 | 8/2003 | Beck et al. |
| 6,681,010 | B1 | 1/2004 | Anderson et al. ...... 379/265.11 |
| 7,356,344 | B2* | 4/2008 | Sato ........................ 455/456.3 |
| 7,401,153 | B2* | 7/2008 | Traversat et al. ............ 709/230 |
| 2002/0027567 | A1 | 3/2002 | Niamir ....................... 345/738 |
| 2002/0099787 | A1 | 7/2002 | Bonner et al. ............... 709/216 |
| 2002/0112058 | A1 | 8/2002 | Weisman et al. |
| 2002/0188657 | A1 | 12/2002 | Traversat et al. |
| 2003/0041141 | A1* | 2/2003 | Abdelaziz et al. ........... 709/223 |
| 2003/0163702 | A1 | 8/2003 | Vigue et al. ................. 713/716 |
| 2003/0204613 | A1 | 10/2003 | Hudson et al. .............. 709/231 |
| 2004/0006586 | A1 | 1/2004 | Melchione et al. .......... 709/201 |
| 2004/0095945 | A1* | 5/2004 | Woog ......................... 370/401 |
| 2004/0148334 | A1* | 7/2004 | Arellano et al. ............. 709/201 |
| 2004/0184478 | A1* | 9/2004 | Donescu et al. ............. 370/462 |
| 2005/0036482 | A1 | 2/2005 | Goroshevsky et al. ....... 370/352 |

FOREIGN PATENT DOCUMENTS

| EP | 0993163 A1 | 4/2000 |
| EP | 0 993 163 A1 | 12/2000 |
| EP | 1 229 443 A2 | 7/2002 |

(Continued)

*Primary Examiner*—Fan Tsang
*Assistant Examiner*—Akelaw A Teshale
(74) *Attorney, Agent, or Firm*—Muncy, Geissler, Olds & Lowe, PLLC

(57) ABSTRACT

Systems and methods for announcing and locating services that are shared in a distributed manner within a peer-to-peer packet-based network are provided. One or more network devices maintain a copy of a particular service and the service is shared by any network device in the network that requires the service. Network devices maintain lists of what services are available on the network as well as where the services are located. When a particular service is desired, the network device consults the lists and is able to request acquisition of the service from any network device known to host the service, either locally or on a remote network device. Service location functionality is also capable of allocating resources and/or services in the network based on statistical information gathered and maintained regarding service use in the network.

29 Claims, 9 Drawing Sheets

FOREIGN PATENT DOCUMENTS

| | | |
|---|---|---|
| EP | 1229443 A3 | 8/2002 |
| EP | 1427170 A2 | 6/2004 |
| EP | 1 427 170 A2 | 9/2004 |
| EP | 1542409 A1 | 6/2005 |
| EP | 1633079 A1 | 3/2006 |
| GB | 2395086 | 12/2004 |
| WO | 0076166 | 12/2000 |

* cited by examiner

SYSTEM AND METHODS FOR ANNOUNCING AND LOCATING SERVICES IN A DISTRIBUTED PEER-TO-PEER NETWORK

FIELD OF THE INVENTION

The invention relates to peer-to-peer networks, in particular the distributed nature of available services.

BACKGROUND OF THE INVENTION

Some modern communications solutions are based on VoIP (Voice-over IP (Internet Protocol)) technology, which involves the transmission of calls over a data network based on IP. The communication is in the form of packet data and thus there is no fixed connection as there would be in the case of switched networks. The communication can be text, voice, graphics or video. In order to simplify IP communication problems, standards have been developed and adopted in the industry. Examples of such standards are H.323 (Packet based communication systems) and SIP (Session Initiation protocol). These standards are followed when designing new hardware and software. The SIP standard covers the technical requirements to set-up, modify and tear down multimedia sessions over the Internet. A multimedia communication session between two endpoints will be referred to as a call.

Conventional peer-to-peer packet-based networks contain multiple network devices that can communicate with each other. One example of such a peer-to-peer network is a network of interconnected VoIP terminal sets. Some VoIP terminal sets are smart phones that supply their own services for operation of the VoIP terminal sets, in which services include audio prompts for voice mail or auto attendant functionality, dialing rules, data storage for recording voice mail messages, and other call processing functions. However, as the number of services in such VoIP terminal sets phones increases, the overall cost of the phone increases as well due to the additional hardware, such as memory, necessary to store service providing program code or data accumulated from use of the services. Therefore, a more efficient manner of service use would benefit the current state of the art in peer-to-peer networks.

SUMMARY OF THE INVENTION

According to a first aspect of the invention, there is provided a peer-to-peer network comprising: a plurality of interconnected peer-to-peer packet-based network devices; and a plurality of services, each hosted by a respective at least one peer-to-peer packet-based network device; each peer-to-peer packet-based network device that hosts at least one service of the plurality of services making the at least one service available to other peer-to-peer packet-based network devices of the plurality of peer-to-peer packet-based network devices; wherein each peer-to-peer packet-based network device that hosts at least one service of the plurality of services announces availability of the at least one service to other peer-to-peer packet-based network devices of the plurality of peer-to-peer packet-based network devices.

According to an embodiment of the first aspect, services include at least one of a group consisting of audio prompts, dialing service, conference mixer, billing collector, time synchronization master, multicast redirector, security administer, assigning and maintaining information pertaining to backup network devices, feature-key licensing, shared remote data storage, and external paging speaker.

According to another embodiment of the first aspect, at least one peer-to-peer packet-based network device of the plurality of interconnected peer-to-peer packet-based network devices is adapted to locate a particular service in the peer-to-peer network resulting from announcements received from other peer-to-peer packet-based network devices of the plurality of peer-to-peer packet-based network devices that hosts the particular services.

According to another embodiment of the first aspect, at least one peer-to-peer packet-based network device of the plurality of interconnected peer-to-peer packet-based network devices is adapted to request acquisition of a respective service in the peer-to-peer network subsequent to locating the respective service.

According to another embodiment of the first aspect, each peer-to-peer packet-based network device comprises: at least one application adapted to request and use a service of the plurality of services supplied by a service module to perform a task; for each service, a respective service module adapted to maintain a list of locations of the service in the peer-to-peer network and adapted to supply the service from either a local source or a remote source; and a service manager adapted to manage interaction between the at least one application and at least one service module.

According to another embodiment of the first aspect, each service module comprises a client component adapted to request acquisition of a respective service, either locally or remotely, that is requested by the at least one application.

According to another embodiment of the first aspect, if a peer-to-peer packet-based network device of the plurality peer-to-peer packet-based network devices hosts a particular service, the service module comprises a hosting service provider component, the hosting service provider component adapted to supply the at least one application with the requested service.

According to another embodiment of the first aspect, each peer-to-peer packet-based network device comprises a client component for each service available to the peer-to-peer packet-based network device and a hosting service provider component for each service hosted by the peer-to-peer packet-based network device; wherein the client component is adapted to request acquisition of a respective service, either locally or remotely, that is requested by the at least one application and the hosting service provider component is adapted to supply the at least one application with the requested service.

According to another embodiment of the first aspect, for a given service of said plurality of services, the given service is dynamically load balanced across more than one peer-to-peer packet-based network device hosting the given service.

According to another embodiment of the first aspect, each peer-to-peer packet-based network device maintains statistical information regarding the services in the peer-to-peer network.

According to another embodiment of the first aspect, services are allocated to particular peer-to-peer packet-based network devices as a function of the statistical information gathered regarding peer-to-peer packet-based network devices.

According to another embodiment of the first aspect, at least one of the plurality of interconnected peer-to-peer packet-based network devices is a Voice over Internet Protocol (VoIP) terminal set.

According to another embodiment of the first aspect, at least one of the plurality of interconnected peer-to-peer packet-based network devices is at least one of a group consisting of an interface for connecting peer-to-peer packet-based network devices to a public switched telephone network (PSTN), an interface for connecting peer-to-peer packet-based network devices to a packet-based network, and a network data storage device.

According to a second aspect of the invention, there is provided a method in a peer-to-peer network comprising a plurality of peer-to-peer packet-based network devices for collectively implementing services in a distributed manner, the method comprising: announcing an available service hosted by a peer-to-peer packet-based network device to other peer-to-peer packet-based network devices of the plurality of peer-to-peer packet-based network devices; maintaining a list of services residing in the plurality of peer-to-peer packet-based network devices; requesting acquisition of a respective service from one of the plurality of peer-to-peer packet-based network devices, the selected peer-to-peer packet-based network device being selected based on the maintained list.

According to an embodiment of the second aspect, the peer-to-peer packet-based network device periodically updates an announcement of the available service to the other peer-to-peer packet-based network devices of the plurality of peer-to-peer packet-based network devices.

According to another embodiment of the second aspect, announcing an available service further comprises a step of registering the available service with the peer-to-peer packet-based network device.

According to another embodiment of the second aspect, the method further comprises a step of the peer-to-peer packet-based network device updating a list of services to include the registered available service.

According to another embodiment of the second aspect, announcing an available service further comprises a step of the peer-to-peer packet-based network device sending an announcement of the available service to the other peer-to-peer packet-based network devices of the plurality of peer-to-peer packet-based network devices.

According to another embodiment of the second aspect, the method further comprises maintaining statistical information regarding the services in the peer-to-peer network.

According to another embodiment of the second aspect, maintaining statistical information regarding the services is statistical information regarding the services hosted by the particular peer-to-peer packet-based network device.

According to another embodiment of the second aspect, maintaining statistical information regarding the services is statistical information regarding the services requested by the peer-to-peer packet-based network device which must be acquired remotely.

According to another embodiment of the second aspect, the method further comprises a step of allocating services to particular peer-to-peer packet-based network devices as a function of the statistical information gathered regarding peer-to-peer packet-based network devices.

According to another embodiment of the second aspect, the method further comprises a step of load balancing across more than one peer-to-peer packet-based network device hosting the given service as a function of the statistical information gathered regarding peer-to-peer packet-based network devices.

According to another embodiment of the second aspect, maintaining a list further comprises the steps of: receiving an announcement of an available service from another peer-to-peer network device of the plurality of peer-to-peer packet-based network devices; maintaining an identification of the available service in a list of available services; and forwarding identification and location information of the available service received in the announcement to a local service module, the service module maintaining the name and location of the available service in a list of names and locations of available services.

According to another embodiment of the second aspect, requesting acquisition of a respective service comprises the steps of: making a request for the respective service; determining which one or more peer-to-peer packet-based network devices of the plurality of peer-to-peer packet-based network devices are hosting the respective service based on the maintained list; contacting a peer-to-peer packet-based network device registered as hosting the respective service; receiving a response from the service hosting peer-to-peer packet-based network device as to whether the service hosting peer-to-peer packet-based network can supply the respective service; requesting acquisition of the respective service if the service hosting peer-to-peer packet-based network device can supply the respective service; and if the service hosting peer-to-peer packet-based network device can not supply the respective service, contacting a different peer-to-peer packet-based network device of other peer-to-peer packet-based network devices registered as hosting the respective service until the respective service can be found to be available.

According to another embodiment of the second aspect, announcing an available service further comprises a step of a hosting service provider component of the peer-to-peer packet-based network device hosting a service registering the available service with a service manager of the peer-to-peer packet-based network device.

According to another embodiment of the second aspect, the method further comprises a step of the service manager updating a list of services to include the registered available service.

According to another embodiment of the second aspect, announcing an available service further comprises a step of a service manager of the peer-to-peer packet-based network device hosting a service sending an announcement of the available service to the other peer-to-peer packet-based network devices of the plurality of peer-to-peer packet-based network devices.

According to another embodiment of the second aspect, requesting acquisition of a respective service comprises the steps of: an application of the peer-to-peer packet-based network device making a request of a service manager of the peer-to-peer packet-based network device for the respective service; the service manager supplying a location of a service module of the peer-to-peer packet-based network device for the respective service to the application; the application contacting the service module to request acquisition of the respective service; a client component of the service module determining which peer-to-peer packet-based network device of the plurality of peer-to-peer packet-based network devices is hosting the respective service based on the maintained list; the client component contacting a hosting service provider component of a service module of a peer-to-peer packet-based network device registered as hosting the respective service; the client component receiving a response from the hosting service provider component hosting the respective service as to whether the peer-to-peer packet-based network device registered as hosting the respective service can supply the respective service; the client component acquiring the respective service if the peer-to-peer packet-based network device registered as hosting the respective service can supply the respective service; and if the peer-to-peer packet-based network device registered as hosting the respective service can not supply the respective service, the client component contacting a hosting service provider component of other peer-to-peer packet-based network devices registered as hosting the respective service until the respective service can be found to be available for use by the application.

According to another embodiment of the second aspect, during the step of the client component contacting a hosting service provider component of a service module for the first time, the client component and the hosting service provider component are in the same service module.

According to another embodiment of the second aspect, during the step of the client component contacting a hosting service provider component of a service module, the client component and the hosting service provider component are in different service modules in different peer-to-peer packet-based network devices.

According to another embodiment of the second aspect, requesting acquisition of a respective service comprises the steps of: an application of the peer-to-peer packet-based network device-making a request of a service manager of the peer-to-peer packet-based network device for the respective service; the service manager contacting the service module to request acquisition of the respective service; a client component of the service module determining which peer-to-peer packet-based network device of the plurality of peer-to-peer packet-based network devices is hosting the respective service based on the maintained list; the client component contacting a hosting service provider component of a service module of a peer-to-peer packet-based network device registered as hosting the respective service; the client component receiving a response from the hosting service provider component hosting the respective service as to whether the peer-to-peer packet-based network device registered as hosting the respective service can supply the respective service; the client component acquiring the service if the peer-to-peer packet-based network device registered as hosting the respective service can supply the respective service; and if the peer-to-peer packet-based network device registered as hosting the respective service can not supply the respective service, the client component contacting a hosting service provider component of other peer-to-peer packet-based network devices registered as hosting the respective service until the respective service can be found to be available for use by the application.

According to a third aspect of the invention, there is provided a computer usable medium having computer readable program code means embodied therein for collectively implementing services in a distributed manner, the computer usable medium residing in a peer-to-peer packet-based network device of a plurality of peer-to-peer packet-based network devices used to collectively implement services, the computer readable program code means comprising: code means for announcing an available service hosted by a peer-to-peer packet-based network device to other peer-to-peer packet-based network devices of the plurality of peer-to-peer packet-based network devices; code means for maintaining a list of services that reside in the plurality of peer-to-peer packet-based network devices; code means for requesting acquisition of a respective service selected from one of the plurality of peer-to-peer packet-based network, the selected peer-to-peer packet-based network device being selected based on the maintained list.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

A peer-to-peer service location feature is provided by embodiments of the invention for efficient usage of shared services. For example, embodiments of the peer-to-peer service location feature provide the following functionality: 1) resource/service allocation, examples of which are determining which network device will host a particular service, load balancing amongst the network devices, moving a service to another host if an original host becomes unsuitable, or increasing/decreasing the number of service hosts depending on usage statistics, 2) announcing service availability, 3) locating a resource/service provider in a peer-to-peer network, and 4) requesting acquisition a resource/service.

A service for the purpose of this application is being defined as a component of software and/or one or more resource that are made available for use in a peer-to-peer network. Some examples of services include audio prompts, for call processing features such as voicemail or an auto attendant, dialing service, conference mixer, billing collector, time synchronization master to synchronize time information between peer nodes, multicast redirector, security administrator, assigning and maintaining information pertaining to backup network devices, feature-key licensing, shared remote data storage, for example storage for services such as voicemail, and external paging speaker. In some embodiments, services are identified by an assigned "Service ID code" that are well known in the system.

Figure 1:
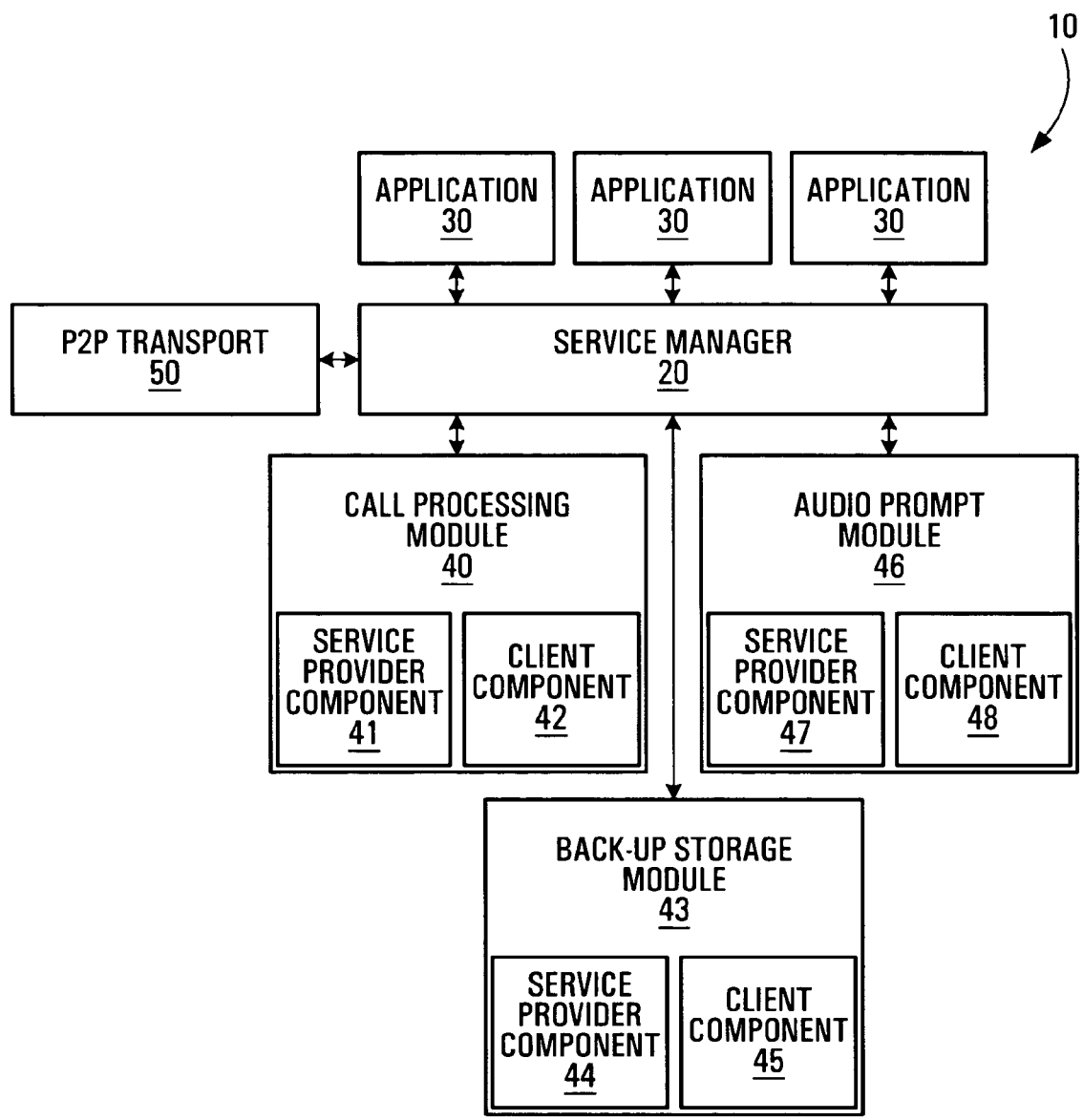
FIG. 1 is a schematic of an architecture for a network device implementing a service location feature as provided by an embodiment of the invention.

FIG. 1 illustrates an architecture 10 for a peer-to-peer packet-based network device in a peer-to-peer environment which uses a peer-to-peer service location feature as provided by embodiments of the invention. The architecture 10 includes a service manager 20, a plurality of applications 30, a plurality of service modules, in particular a call processing service module 40, a backup storage service module 43, and an audio prompt service module 46, and a peer-to-peer transport 50. The applications 30, service modules 40,43,46, and peer-to-peer transport 50 are all coupled to the service manager 20. In general, the service manager keeps track of service types available in the peer-to-peer environment and each service module keeps track of locations of a particular service type associated with the service module that are available in the peer-to-peer environment. The service modules 40,43,46 are shown to each have a client component 41,44,47 and service provider component 42,45,48. More generally, the client component 41,44,47 exists on all peer-to-peer packet-based network devices that are able to use the service and the service provider component 42,45,48 exists only on peer-to-peer packet-based network devices that host a particular service. Each service module has the ability to create a local service provider for the service. For example, a client component of a service module can request the service from the provider component of another network device, download the service and create a provider component so that the service is now located on the local network device.

In FIG. 1, three applications 30 and three particular service modules 40,43,46 are shown. More generally, the peer-to-peer packet-based network device can have any number of different applications and any number of different service modules.

In operation, the service manager 20 acts as a broker between the plurality of applications 30, which request a particular service, and the plurality of service modules 40,43, 46. The service modules 40,43,46 register with the service manager 20 to announce the availability of the service that the respective service modules 40,43,46 provide. The service manager 20 uses the peer-to-peer transport 50 to announce the availability of the services capable of being provided that are local to the peer-to-peer packet-based network device to other peer-to-peer packet-based network devices in the peer-to-peer environment and receive announcements of services capable of being provided by other peer-to-peer packet-based network devices in the peer-to-peer environment.

Application 30 locates a service by querying the service manager 20. The service manager 20 provides location information for a service instance to the application 30, which in some embodiments is an identification of the client component of the service module, whereby the application 30 uses the location information to contact the client component. The client component then requests the service from a service provider component of a service module. The service provider may be either local, in the same service module as the client component or in a remote location in a different network device of the peer-to-peer environment.

For example, if the application 30 requests a call processing service, the service manager 20 provides a location information for the client component 42 in the call processing module 40. After receiving the location information, the application 30 contacts the client component 42 to request the service. The client component 42 then requests the service from service provider component 41 locally or from a service provider component of a remote network device via the peer-to peer transport 50.

In some embodiments, the service manager 20 contacts the service instance directly as opposed to the application 30 contacting the service instance after it has received the location information of the service instance.

When a network device that has been assigned to host a service begins hosting the service, the network device will send out an initial announcement to other network devices to which the network device can provide the service. The network device is assigned a service by an administrator or by functionality of the service location feature itself, for example by use of statistical information regarding services in the peer-to-peer environment, which will be described in more detail below. In some embodiments, after the initial announcement, the network device will continue to periodically send the service announcement message identifying that the network device can supply the service. In some embodiments, the network device sends service announcements out as infrequently as possible to avoid network overhead associated with sending the service announcements, but frequently enough to ensure that other network devices are aware of the network device presence at all times. Hence, the service announcements are published at network device start-up and after subsequent network device status changes (a network device added, a network device becoming active). In some embodiments, the network device will also force the service announcement to be sent out whenever the service module undergoes a configuration and/or state change.

Each network device participating in the peer-to-peer environment maintains a table of the services (keyed on the "Service ID code") provided along with an associated provider of that service. When identification of new or additional services are received by the network device from other network devices the table is updated to reflect the new or additional services. In some embodiments, the service manager maintains a table of services. In some embodiments, the service module maintains a table of service locations.

Figure 2:
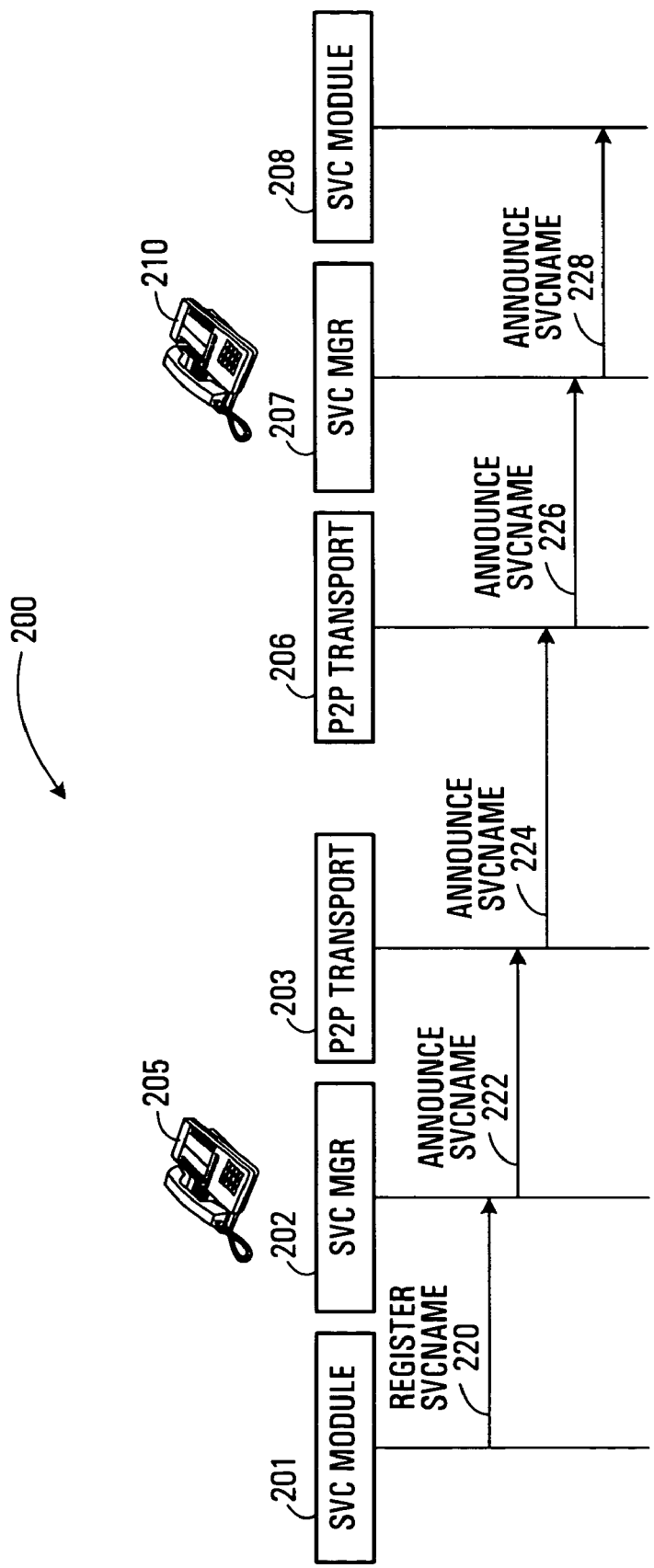
FIG. 2 is a signal flow for announcing a service as provided by an embodiment of the invention.

FIG. 2 illustrates a signal flow 200 involved in announcing an available service. In the particular situation illustrated a first peer-to-peer network device 205, which is shown to be a terminal set, is announcing the availability of a service to a second peer-to-peer network device 210, which is also a terminal set. The first peer-to-peer network device 205 includes a service module 201, a service manager 202, and a peer-to-peer transport 203. The second peer-to-peer network device 210 includes a peer-to-peer transport 206, a service manager 207, and service module 208. In this example, the service module 201 includes both a client component and a service provider component as it maintains the service locally. In this example, the service module 208 includes as least a client component and may or may not contain a service provider component.

In the signal flow 200, the service module 201 of the first peer-to-peer network device 205 registers 220 with the service manager 202 of the first peer-to-peer network device 205. The service manager 202 sends an announcement 222 of availability of a service to the peer-to-peer transport 203 so that the peer-to-peer transport 203 can deliver the announcement to the second peer-to-peer network device 210. The peer-to-peer transport 203 sends 224 the announcement to the peer-to-peer transport 206 of the second peer-to-peer network device 210. The peer-to-peer transport 206 supplies 226 the announcement to the service manager 207 of the second peer-to-peer network device 210. The service manager 207 sends 228 the announcement to the service module 208 of the second peer-to-peer network device 210. As described above, this allows the service manager 207 of the second peer-to-peer network device 210 to know that the service is available and the client component of the service module 208 of the second peer-to-peer network device 210 to maintain a list of locations of particular services.

FIG. 2 shows the first peer-to-peer network device 205 announcing availability of a service to the second peer-to-peer network device 210, however it is to be understood that more generally the first peer-to-peer network device 205 announces the availability of the service to any number of network devices that are a part of the peer-to-peer environment.

Figure 3:
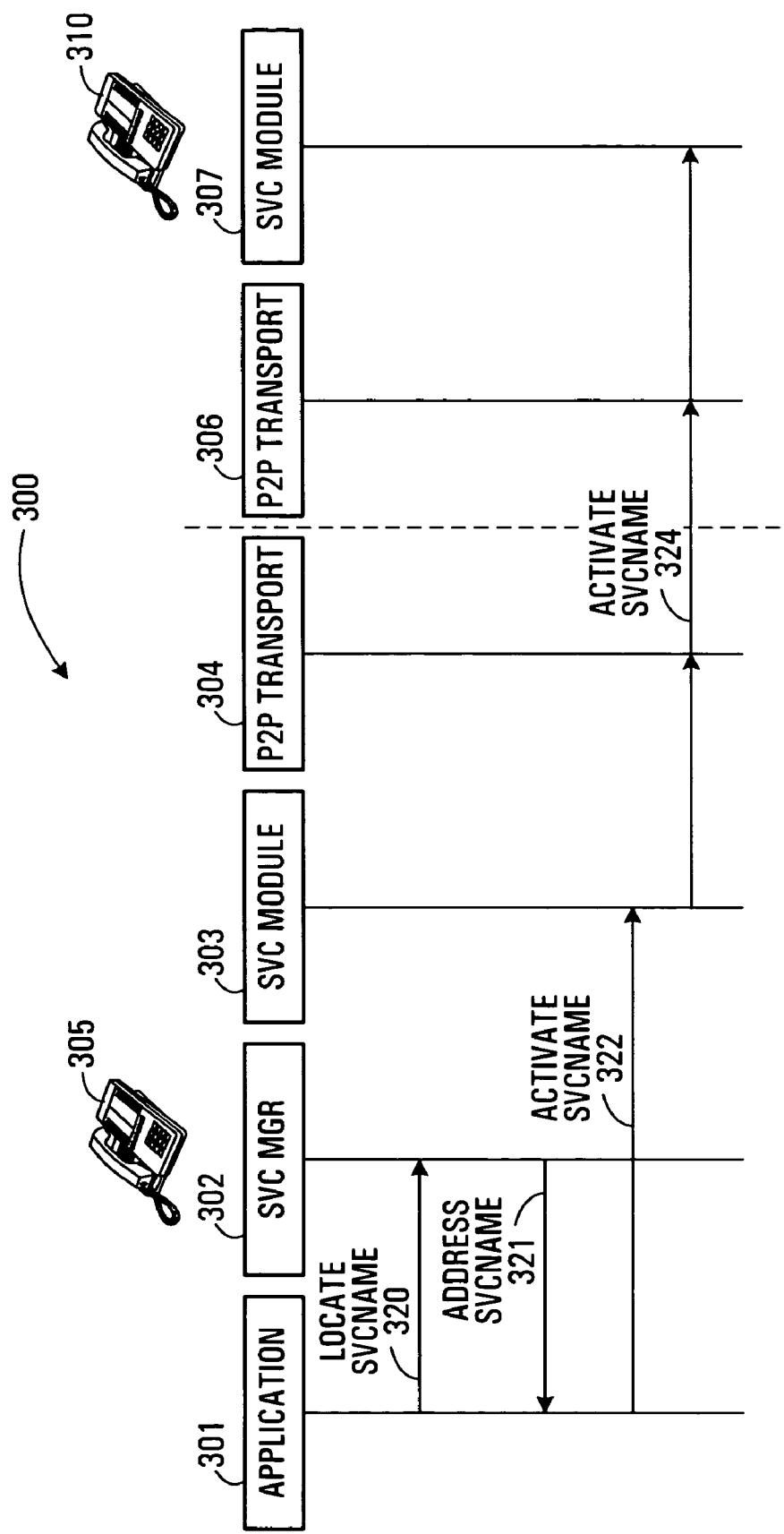
FIG. 3 is a signal flow for requesting an available service as provided by an embodiment of the invention.

FIG. 3 illustrates a signal flow 300 involved in requesting a desired service. In the particular example illustrated a first peer-to-peer network device 305, which is a terminal set, is requesting a service. The first peer-to-peer network device 305 includes an application 301, a service manager 302, a service module 303 and a peer-to-peer transport 304. A second peer-to-peer network device 310, which is also shown to be a terminal set, includes a peer-to-peer transport 306 and a service module 307. In this example, the service module 303 in the first peer-to-peer network device 305 includes a client component but does not contain a service provider component as the service being requested is not maintained locally. The service module 307 in the second peer-to-peer network device 310 includes a client component and a service provider component as the service being requested is maintained locally on the second peer-to-peer network device 310.

In the signal flow 300, the application 301 in the first peer-to-peer network device 305 requires a service and therefore sends a request 320 to the service manager 302 to locate the service. The service manager 302 responds to the request by sending 321 the application 301 an identification of a location of the client component in the service module 303. The application 301 sends a request 322 to the client component in the service module 303 to provide the service. Since there is no service provider component in the first peer-to-peer network device, the client component in the service module 303 contacts 324 the service provider component in the service module 307 of the second peer-to-peer network device via the peer-to-peer transports 304, 306 to request the service, as service module 307 is known to maintain the service.

In some embodiments, the service manager 302 consults a Service Provider Table to obtain the identification of the location of the client component in the service module 303.

In some embodiments, the client component in the service module 302 consults a Service Provider Table to obtain the identification of the location of the service provider component in the peer-to-peer environment either locally or at a remote location.

In the example of FIG. 3 the service module 303 of the first peer-to-peer network device 305 is described as not maintaining the service. In some embodiments, the service module 303 does maintain the service and has a service provider component. Therefore, the client component in the service module 303 contacts the service provider component local to the first peer-to-peer network device 305 to supply the service instead of requesting the service from a remote network device, such as the second peer-to-peer network device 310.

Figure 4:
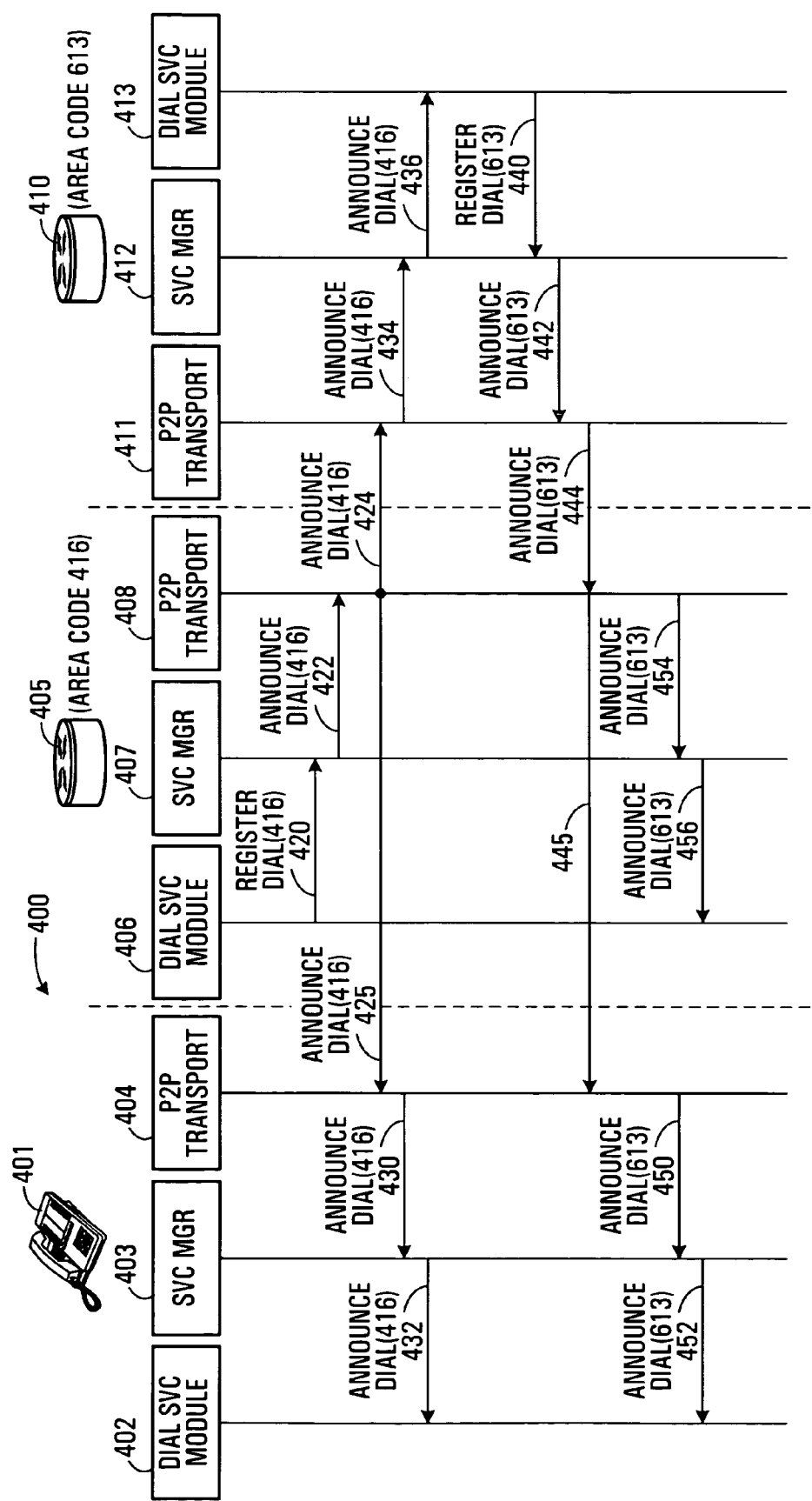
FIG. 4 is a signal flow for an example demonstrating network devices announcing a dialing service to other network devices.

Referring to FIG. 4, a practical example of announcing a service will now be described. The service being announced is a long distance dialing service. Network devices in the example include a terminal set 401 and first and second interfaces 405,410 capable of accessing different area codes. The interfaces 405,410 announce their respective services so that the terminal set 401 is aware that the respective services are available. The first interface 405 is capable of dialing a 416 area code and the second interface 410 is capable of dialing a 613 area code. The terminal set 401 includes a dialing service module 402, a service manager 403, and a peer-to-peer transport 404. The first interfaces 405 includes a dialing service module 406, a service manager 407, and a peer-to-peer transport 408. The second interfaces 410 includes a dialing service module 413, a service manager 412, and a peer-to-peer transport 411.

In signal flow 400, the dialing service module 406 of the first interface 405 registers 420 with the service manager 407 of the first interface 405. The service manager 407 sends 422 an announcement of availability of a service dialing a 416 area code to the peer-to-peer transport 408 of the first interface 405 so that the peer-to-peer transport 408 can deliver the announcement to the other network devices in the peer-to-peer environment. The peer-to-peer transport 408 sends 424 the announcement to the peer-to-peer transport 404 of the terminal set 404 and sends 425 the announcement to the peer-to-peer transport 411 of the second interface 410. At the terminal set 401, the peer-to-peer transport 404 supplies 430 the announcement to the service manager 403 of the terminal set 401. The service manager 403 sends 432 the announcement to the dialing service module 402 of the terminal set 401. At the second interface 410, the peer-to-peer transport 411 supplies 434 the announcement to the service manager 412 of the second interface 410. The service manager 412 sends 436 the announcement to the dialing service module 413 of the second interface 410. The announcement from the first interface 405 allows the service managers 403,412 to know that a dialing service capable of dailing a 416 area code exists on the network and the dialing service modules 402, 413 to know a particular location where the dialing service capable of dailing a 416 area code is located.

A similar process is performed by the second interface 410 announcing that it maintains a dialing service that is capable of dialing the 613 area code in steps 440, 442, 444, 445, 450, 452, 454, and 456.

FIG. 4 shows the interfaces 405,410 announcing availability of the respective dialing services to the other respective interface 410,405 and the terminal set 401. More generally, when any number of network devices are included in a network, it is to be understood that the announcements regarding the availability of the respective dialing services are sent to all network devices that are in the network.

In the example, the first and second interfaces 405,410 both contain a dialing service module. However, the particular types of dialing services that are provided are different because the parameters of the dialing services are different. More generally, a service can have a plurality of different parameters resulting in a variety of different services within a respective service type. Providing service types with slightly different parameters can cause valuable memory to be consumed in a network device. By using a service location feature provided by embodiments of the invention services are distributed around the network reducing the overall memory required by any given network device because each device does not need sufficient memory for every service used by the network device.

Figure 5:
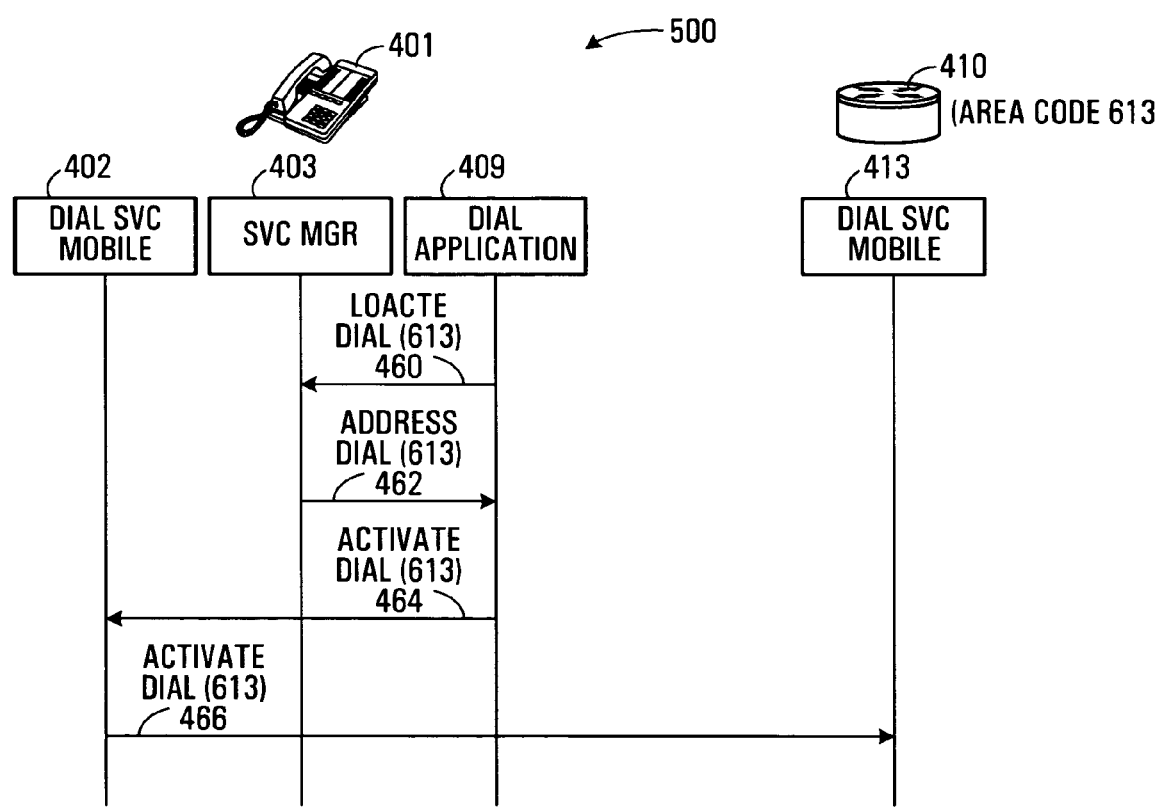
FIG. 5 is a signal flow for an example demonstrating a network device requesting a dialing service that has been previously announced as shown in FIG. 4.

Referring to FIG. 5, a practical example of requesting acquisition of a service using an embodiment of the service location feature will now be described.

Continuing from the long distance dialing service example of FIG. 4 described above, signal flow 500 shows a dialing application 409 of the terminal set 401 requires a dialing service for dialing a 613 area code. The dialing application 409 sends 460 a request to the service manager 403 to locate a dialing service capable of dialing a 613 area code. The service manager 403 responds to the request by sending 462 an identification to be used to contact the dialing service module 402 in the terminal set 401. The dialing application 409 sends 464 a request to the client component of the dialing service module 402 to provide the dialing service for dialing the 613 area code. The dialing service module 402 then uses parameters of the request, such as a 613 area code, to determine which dialing service module to contact. Based on the above example in which the interface 410 announced that the dialing service module 413 of the second interface 410 maintains the dialing service for dialing the 613 area code, the client component of the dialing service module 402 contacts the service provider component of the dialing service module 413 to request 466 the dialing service module 413 provide the dialing service for dialing the 613 area code. If the interface accepts the request to provide the long distance dialing service the client component of the dialing service module 402 then acts as an intermediary for future requests and responses between the dialing application 409 and the service provider component of the dialing service module 413 of the second interface 410.

In some embodiments, request 466 is a service specific operation. For example, for a dialing service, the request 466 may be a SIP INVITE message. More generally, the request may be other protocol types that can perform a similar function. In some embodiments, the request 466 is transported to another peer-to-peer network device via the peer-to-peer transport component, as shown in FIG. 2, or another proprietary mechanism.

The particular service described in FIGS. 4 and 5 is described as a long distance dialing service. More generally, the service could be of any type described above or not described but known to be a service that is used in conventional telephony services.

The signal flow charts of FIGS. 2, 3, 4 and 5 described above are intended as examples of how announcing services and requesting services which have been registered as available are implemented. In some embodiments it may not be necessary to include all of the messages as described herein and in some embodiments there may be additional steps which are included to improve operation of the service location feature. It should also be understood that the ordering of the signals in the signal flows as described herein are but examples of how the process may be implemented. Ordering of steps may have some deviation from those described above and still fall within the subject matter of the invention.

Network devices which utilize embodiments of the service location feature are packet-based telephones such as IP (Internet Protocol) telephone terminal sets. Other examples are a video phone, a PDA (Personal Digital Assistants), a wireless device, a computer supporting peer-to-peer voice over packet-based communication or a wireless telephone that can be suitably programmed and configured to provide the service location features described below. In some cases, the terminal sets are for example IP phones such as that manufactured by Mitel, Nortel, Avaya, Siemens, NEC, Pingtel or 3COM.

In some embodiments, network devices that utilize the service location feature provided by embodiments of the invention are other peer-to-peer packet-based devices such as interface 405, for example a thin truck interface (TTI) for connecting a peer-to-peer network to a public switch telephone network (PSTN) described in co-pending U.S. patent application Ser. No. 10/740,405, an internet protocol interface IPI for connecting a peer-to-peer network to a internet protocol network (IPN) described in U.S. Provisional Patent Application No. 60/434,813 entitled "DISTRIBUTED PEER-TO-PEER VOICE MAIL SYSTEM, METHOD AND TELEPHONE TERMINALS" and filed Dec. 20, 2002, or any network device that could be used for data storage for example.

Figure 6:
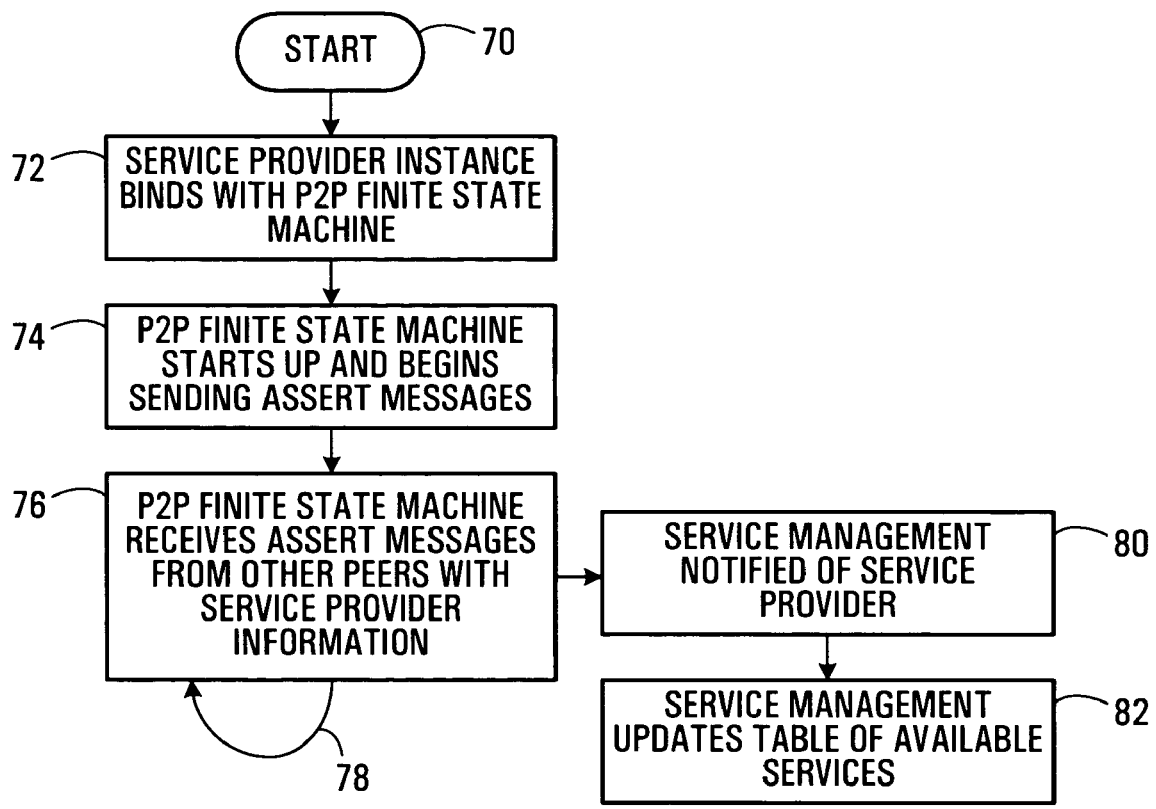
FIG. 6 is a flow chart for a method of announcing an available call processing service and maintaining a list of announced available services as provided by an embodiment of the invention.

FIG. 6 illustrates a flow chart for a method of operating a service location feature involving announcing a service after start up and maintaining information of services announced as available. An initial step 70 is the start of the method. Following the start step 70, a service module is bound 72 to the peer-to-peer finite state machine that defines how peer-to-peer networking occurs in a peer-to-peer packet-based network device. When the peer-to-peer packet-based network device is connected to a peer-to-peer network the peer-to-peer finite state machine starts sending 74 messages to other peer-to-peer packet-based network devices in the peer-to-peer network of the status of the peer-to-peer packet-based network device, including the announcement of the available service. The peer-to-peer packet-based network device also receives 76 messages from other peer-to-peer packet-based network devices in the peer-to-peer network that announce the availability of services on the other peer-to-peer packet-based network devices. The peer-to-peer packet-based network device receives messages from the other peer-to-peer packet-based network devices on a continual basis 78 that announce the availability of services.

When the peer-to-peer packet-based network device receives messages from the other peer-to-peer packet-based network devices, service management is notified 80 of service availability. In some embodiments, notification of service availability involves the service manager being notified of the service that is available and the service module being notified of the service and the service location that is available. After the service management has been notified 80 of service availability, the service management proceeds to update 82 maintained lists of available services, for example the service manager updates the list of available services and the service module updates the list of available services and service locations.

Figure 7A:
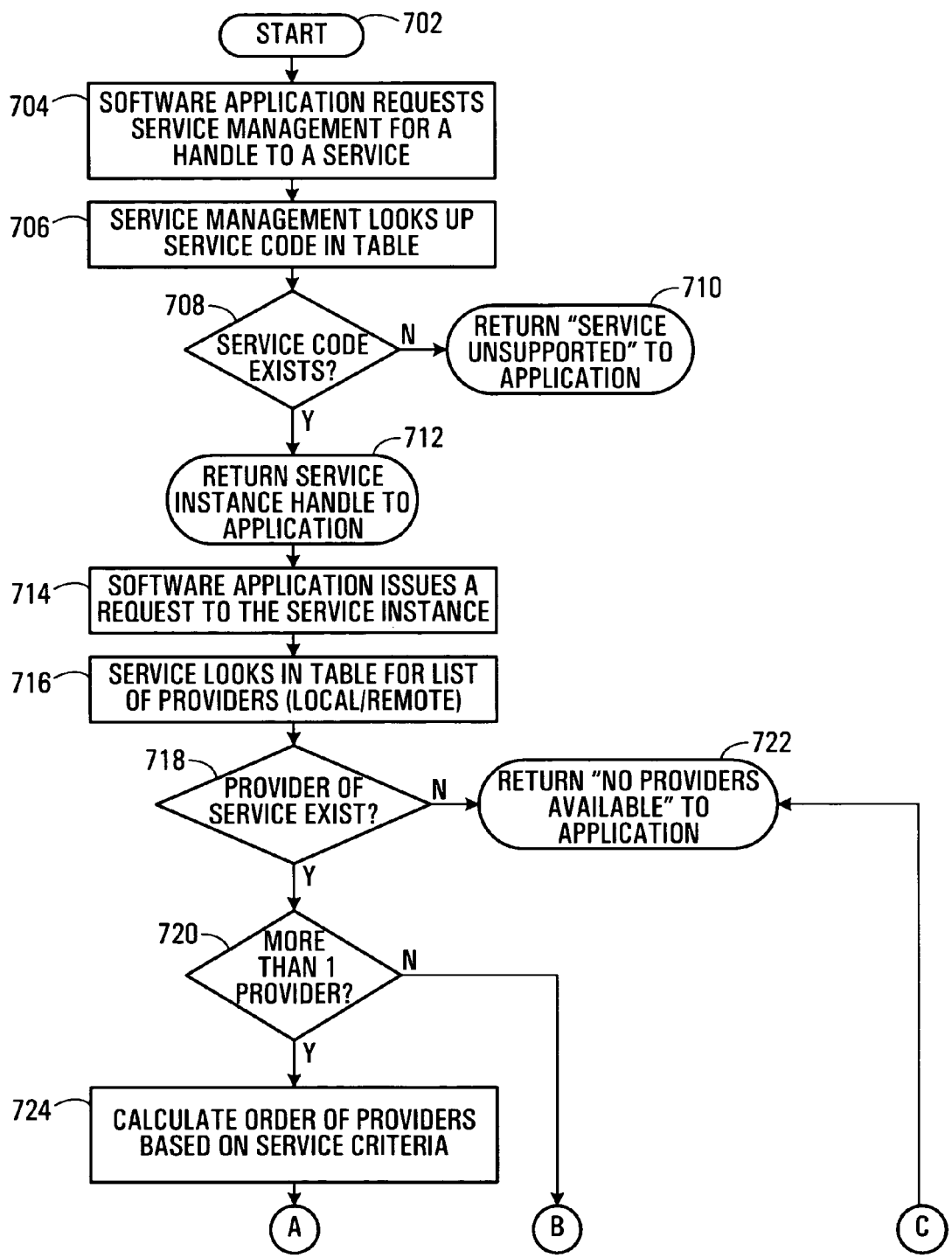
FIGS. 7A and 7B are a flow chart for a method of requesting acquisition of a call processing service based on announced services on a peer-to-peer network as provided by an embodiment of the invention.
Figure 7B:
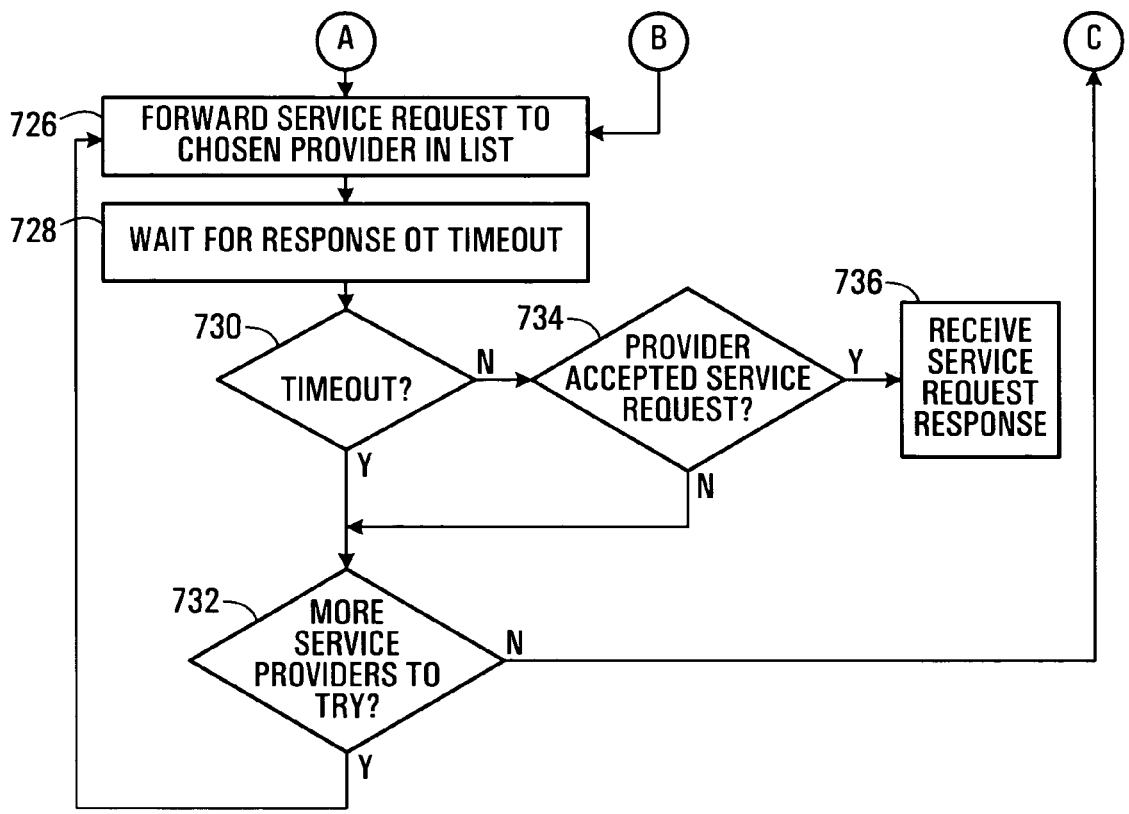

Referring to FIG. 7, a method for requesting acquisition of a service using information announced regarding available services will now be described. After the initial start step 702, an application requiring a call processing service to perform a task requests 704 service management for a handle to a required service. Service management responds to the request 704 by looking up 706 the service, for instance using the "Service ID code" in a table or list of services maintained by service management. At step 708, service management determines if the service is known to exist. If the service does not exist (no path) in the table of services, service management notifies the application of this fact by returning 710 an appropriate message to the application, for example "Service Unsupported". If the service is supported (yes path), then service management notifies the application by returning 712 a service instance handle to the application, for example the identification or address of the client component of the required service module. The application, having received the identification of the service instance of the required service module, proceeds to issue 714 a request to the service instance so as to acquire the service. The service instance looks 716 in a table that is maintained by the service instance including locations of providers of the required service. At step 718, the service instance determines if a provider of the service is available or is known to exist. As described above, the service instance, in particular the client component maintains a list of service providers. The list contains service providers that are local to the network device or remote service providers located on a different network device. If no service provider is currently available (no path), the service instance notifies 722 the application of this fact by returning an appropriate message to the application, for example "No Providers Available". If a service provider is available (yes path), then the service instance determines 720 how many service providers are available, for example if there are more than one service provider. If there is only a single service provider (no path), then the service instance forwards 724 the request to the single service provider. If there are more than one service providers (yes path), the service instance calculates 724 a preferred order of service providers for requesting the service based on a service criteria. In some embodiments, a local service provider is always the first choice in choosing the service provider to request acquiring the required service. In some embodiments, the service criteria involves using statistical information that is maintained regarding services available on the peer-to-peer network, as described below. After a particular service provider is chosen, the service instance forwards 726 the request to the chosen service provider. After the request is forwarded 724,726 to the chosen service provider, the service instance waits 728 for a response from the chosen service provider or a "TIMEOUT" indicating no response is received from the chosen service provider. At step 730, the service instance determines if a "TIMEOUT" has been received. If a "TIMEOUT" has been received (yes path), the service instance determines 732 if there are more service providers to try. If there are more service providers to try (yes path) then the service instance returns to step 726 and forwards the service request to the next chosen provider in the calculated order of service providers. If there are no other providers to try (no path), the service instance notifies 722 the application of this fact by returning an appropriate message to the application, for example "No Providers Available". If no "TIMEOUT" has been determined at step 730 (no path), the service instance determines 734 if the chosen service provider accepted the service request. If the service provider has not accepted the service request (no path), the service instance determines 732 if there are more service providers to try. If the service request has been accepted (yes path), the service instance receives 736 the request response.

Following the method as described above the service instance and the service provider arrange for the required service to be supplied to the application. The service instance continues to act as an intermediary between the service provider that accepts the request and the application that requested the required service.

In some embodiments, if a network device is inactive for some reason, such as the network device is disconnected from the peer-to peer network, the service manager of the network device requesting a service is notified of this information by an underlying aspect of peer-to-peer communication between network devices and the service manager takes this information into account when calculating 724 the preferred order of service providers in the table of service providers.

In some embodiments, the client component of the service module collects information to generate statistics regarding the service. An example of such information is a number of requests for the service in a given period of time, a number of requests for the service maintained by the local network device that have been rejected for a given period of time, or a number of requests from the local client component for a service maintained by an other network device that have been rejected for a given period of time. Statistics based on such information gathered by client components are used to determine resource and service allocation. In some embodiments, the client component uses the data to determine from which network device the client component sends a request for a service to be provided. For example, if a particular network device is known to have a consistently high rejection rate for service requests, the client component may choose a different network device to send the service request.

In some embodiments, the information and statistics determined by the client component are used to determine which nodes should host a service or determine whether a number of service hosts should be increased or decreased. Using the statistics it is possible to determine if an average threshold for a service has been exceeded. Keeping an average threshold low will help maintain a reasonable load distribution across the network, for example 5%. In some embodiments, each network device monitors the statistics and if an average total network request for the service exceeds 5% it concludes that a new host is required to provide the service. A method is used to select a new additional host network device, for example a lowest media access control (MAC) address for network devices that are not hosting the service, and this network device will add itself to a hosting service pool and start providing the service. In some embodiments, there are two threshold values that are monitored. A first threshold is the threshold described above for adding a network device to the hosting service pool of providers and a second threshold, for which a network device starts to reject any request for the service. The first and second threshold values are to be optimized for preferred system performance. In a particular embodiment, the first threshold may have a value equal to 5% and the second threshold may have a value equal to 7%. Similarly, if a service is to be removed from the peer network then a lower threshold, for example 2%, is applied and another predetermined method is used for removing the service from a hosting network device, such as a largest MAC address of network devices hosting the service. To avoid unnecessary adding and removal of services the monitoring of information and statistics must be performed over a sufficient period of time to avoid transients conditions or non-typical spikes in the number of service requests. For example, an appropriate duration of monitoring statistics to determine if a threshold value is exceeded may be 5 minutes with respect to adding a new hosting service and 20 minutes for removal of a service. Of course it is to be understood that these are only examples of durations of time and the durations could be any value that is optimized for a particular system.

In some embodiments, a service has attributes associated with it. Examples of such attributes are statistical information regarding usage of the service, area codes for dialing services, an amount of storage space available for a data storage service. The example attributes described above are not meant to limit the invention to solely these attributes, but it is to be understood that other attributes exist that are associated with other services.

In some embodiments, a service is pre-defined by the system, for example at build-time of the peer-to-peer environment and automatically allocated at system start-up, configuration-based, for example an administrator configures a new service in the system, or defined by a "pluggable" module.

In some embodiments, the services are secured services. In other embodiments, the services are non-secured services.

Service types are considered to be fixed, global single-instance, and global multiple-instance. A fixed service type is a service that only runs (and is active) on a single designated network device. A global single-instance service type is a service type that exists at only one location within the peer network. The location is not designated to only a designated network device, it may appear on any network device in the peer network. A global multiple-instance service type is a service type that occurs more than once within the peer network. The number of instances of the global multiple-instance service within the peer network will rise and fall with demand, for example as determined by availability and usage statistics.

Another particular peer-to-peer service that takes advantage of the service location feature is remote data storage. This service implements an ability to store an arbitrary chunk of data on a remote node or network device in a peer-to-peer network. An example of a use of such a service would be for a voicemail feature, in which voicemail data is stored on redundant network devices.

The term "data chunk" will be used to describe an arbitrary chunk of data. In some embodiments, the data is stored as byte-encoded buffers. Actions such as adding data, replicating data, getting data, modifying data or deleting data can be performed on a data chunk.

In some embodiments, during start up of the service, the configuration of the amount of data to be available is defined for the remote data storage service. Types of storage may include persistent storage that persists a node restart, runtime storage that will not persist a restart, for instance storage maintained in RAM, or removeable storage such as USB or a flash card. Any additional memory added, such as removeable storage can at run-time inform the service of additional storage space.

Figure 8:
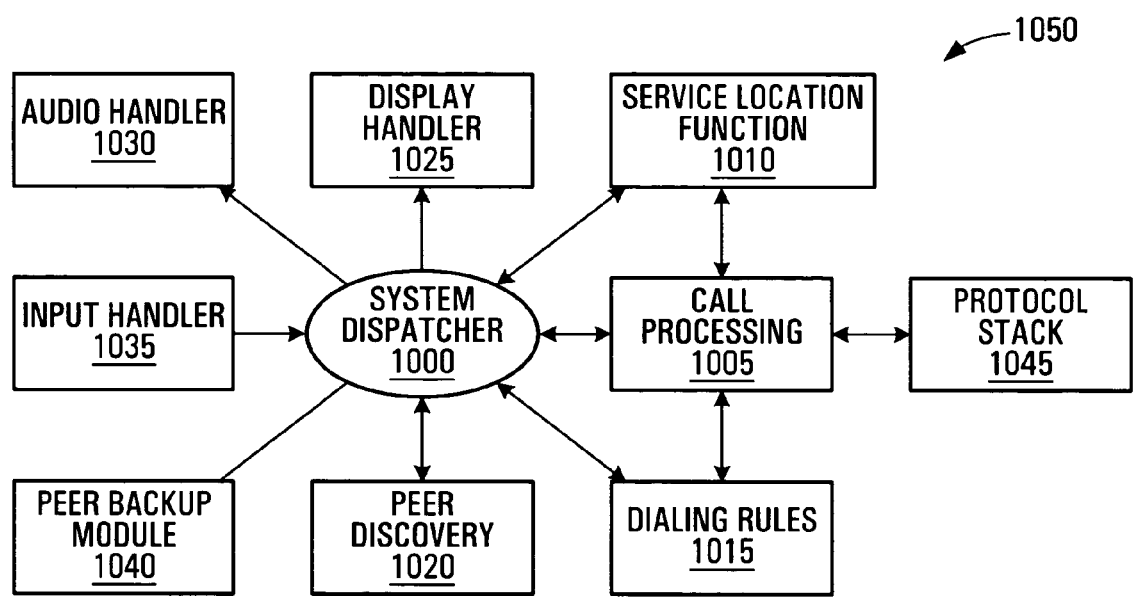
FIG. 8 is a functional block diagram of software operating on a peer-to-peer packet-based network device.

FIG. 8 shows a functional block diagram of software 1050 operating on peer-to-peer packet-based network devices such as terminal set 205 or 210 of FIG. 2. The software 1050 includes modules for performing particular functions, for example the service location feature, as well a module for distributing information between the modules. The software 1050 will be described as operating on terminal set 205; however, it is to be understood that similar software is implemented in other peer-to-peer packet-based network devices, for example the interfaces 405,410, that include the long distance dialing service. The software 1050 is stored in RAM and runs on a CPU, both also included in a network device such as terminal set 205 or interfaces 405,410. More generally, the software 1050 can be implemented as any suitable combination of instructions stored in memory for execution by general or special purpose processors, firmware, ASICs (Application Specific Integrated Circuits), FPGAs (Field-Programmable Gate Arrays), and general or special purpose logic. A system dispatcher 1000 provides communication and scheduling between various functional elements which include a call processing module 1005, a Service Location module 1010, a dialing rules module 1015, a peer discovery module 1020, a display handler 1025, an audio handler 1030, an input handler 1035, and a peer back-up module 1040. The call processing module 1005 also interfaces with a protocol stack 1045.

FIG. 8 shows a detailed example of functions that may be included in a network device such as terminal set 205 or interface 405; however, it is to be understood that a network device need not have all of the functions shown in FIG. 8 and that in some implementations a network device will have only some of the functionality shown in FIG. 8. In fact, in some embodiments these modules or functions are service modules which can be utilized in combination with the service location feature as described herein and as such each network device does not have all the functions shown in FIG. 8.

The display handler 1025 formats information and displays the information to a user, for example via a display screen that is part of the network device user interface. The input handler 1035 monitors inputs from for example key presses, hook switch, volume keys, and hands free and mute buttons and informs the system dispatcher 1000. The system dispatcher 1000 then distributes messages to other modules for further appropriate action to be taken. The audio handler 1030 plays audio tones such as ringing, busy, and call waiting tones and/or connects to a handset speaker or speaker phone through a media call upon receipt of an audio message from the system dispatcher 1000.

When terminal set 205 is initially connected to a peer-to-peer network it performs a peer discovery by executing the peer discovery module 1020. At this point terminal set 205 undergoes a discovery of peer network devices such as terminal set 210 and other network devices that are connected to the peer-to-peer network, by way of messages between terminal set 205 and other network devices. Once the other network devices are discovered, information is exchanged between the terminal set 205 and the other terminal sets and network devices. In some embodiments, this is how announcements of available services in a given peer-to-peer packet-based network device are communicated to other peer-to-peer packet-based network devices. In some embodiments, the information exchanged in the messages is included in a routing table so that peer-to-peer packet-based network devices are made aware of back-up device designation information.

If a peer-to-peer packet-based network device is unavailable to process a call, for example is non-functional or not connected to the peer-to-peer network, the call is re-directed to one of its designated backup network devices and the designated backup network device receiving the re-directed call provides call processing functionality for the network device that is unavailable. In some embodiments, peer-to-peer packet-based networks each have at least one back-up network device which provides back-up support for the unavailable peer-to-peer packet-based network device when it is not connected to or is otherwise not currently accessible. In some embodiments, the back-up terminals maintain a copy of all relevant configuration data for the peer-to-peer packet-based network device requiring back-up and use this information to provide appropriate call handling.

On a more simplified level, each network device maintains an identification of its designated backup network devices and an address for each designated backup network device. In particular, when a new packet-based network device is added to a peer-to-peer network, the peer-to-peer packet-based network device makes use of its peer discovery module 1020 to obtain routing information pertaining to other network devices in the remote network 30 and makes use of the peer backup module 1040 to designate two other network devices as backup network devices.

Referring back to FIG. 8, the dialing rules module 1015 contains and/or applies a set of dialing rules for the call-processing module 1005, which control how calls are directed.

The call-processing module 1005 interacts with the protocol stack 1045 to set up and tear down calls, and to set up media calls.

The call processing modules of a number of network devices collectively serve to deliver PBX-like (Private Branch Exchange-like) call processing capabilities in a distributed fashion without the need for a PBX (Private Branch Exchange). For example, the call processing module 1005 of terminal set 205 handles calls not only intended for terminal set 205 but also handles calls for other network devices for which it has been designated as a backup terminal set.

The Service Location module 1010 has functionality for announcing services, maintaining lists of services, and requesting acquisition of services as described above.

In some embodiments of the invention, routing information is maintained to allow the peer-to-peer packet-based network devices of a peer-to-peer network to provide call facilitating functionality. Some call facilitating functionalities include, but are not limited to, call processing functionalities such as call forwarding, call transfer, voice mail, call park and call park pickup, and paging, and other call related functionalities such as time synchronization, backup features, peer discovery, directory services, administrative services, and encryption. Some of these functionalities are described in U.S. Provisional Patent Application No. 60/441,481 entitled "DISTRIBUTED PEER-TO-PEER CALL TRANSFER SYSTEM, METHOD AND TELEPHONE TERMINALS" and filed Jan. 22, 2003; U.S. Provisional Patent Application No. 60/441,121 entitled "DISTRIBUTED PEER-TO-PEER CALL FORWARDING SYSTEM, METHOD AND TELEPHONE TERMINAL" and filed Jan. 21, 2003; U.S. Provisional Patent Application No. 60/434,813 entitled "DISTRIBUTED PEER-TO-PEER VOICE MAIL SYSTEM, METHOD AND TELEPHONE TERMINALS" and filed Dec. 20, 2002; U.S. Provisional Patent Application No. 60/473,877 entitled "DISTRIBUTED PEER-TO-PEER CALL PARK AND CALL PARK PICKUP SYSTEM, METHOD AND TELEPHONE TERMINALS" filed May 29, 2003; U.S. Provisional Patent Application No. 60/518,646 entitled "PEER-TO-PEER DISCOVERY SYSTEM, METHOD AND NETWORK DEVICES" filed Nov. 12, 2003; U.S. Provisional Patent Application No. 60/523,703 entitled "PEER BACK-UP IN A DISTRIBUTED PEER-TO-PEER NETWORK: SYSTEM, METHOD AND NETWORK DEVICES" filed Nov. 21, 2003; U.S. Provisional Patent Application No. 60/523,140 entitled "TIME SYNCHRONIZATION OF NETWORK DEVICES IN A NETWORK: SYSTEM, METHOD AND NETWORK DEVICE" filed Nov. 19, 2003; U.S. Provisional Patent Application No. 60/524,041 entitled "SYSTEM, METHOD AND NETWORK DEVICES FOR PAGING IN A NETWORK" filed Nov. 24, 2003; U.S. Patent Application No. 60/434,813 entitled "VOICE MAIL SYSTEM, METHOD AND NETWORK DEVICES" filed Dec. 22, 2003 U.S. patent application Ser. No. 10/760,530 entitled "CALL FORWARDING SYSTEMS, METHODS AND NETWORK DEVICES" filed Jan. 21, 2004; U.S. patent application Ser. No. 10/762,754 entitled "CALL TRANSFER SYSTEM, METHOD AND NETWORK DEVICES" filed Jan. 22, 2004; U.S. patent application Ser. No. 10/851,107 entitled "CALL PARK AND CALL PARK PICKUP SYSTEMS, METHODS AND NETWORK DEVICES" filed May 24, 2004; and U.S. patent application Ser. No. 10/952,905 entitled "INFORMATION DISTRIBUTION SYSTEM, METHOD AND NETWORK DEVICE" filed Sep. 30, 2004, all of which are incorporated herein by reference. It is to be clearly understood, however, that embodiments of the invention are not limited by the type of call facilitating functionality being provided.

Numerous modifications and variations of the present invention are possible in light of the above teachings. It is therefore to be understood that within the scope of the appended claims, the invention may be practised otherwise than as specifically described herein.

The invention claimed is:

1. A peer-to-peer network comprising:
a plurality of interconnected peer-to-peer packet-based network devices; and
a plurality of services, each hosted by a respective at least one peer-to-peer packet-based network device;
each peer-to-peer packet-based network device that hosts at least one service of the plurality of services making the at least one service available to other peer-to-peer packet-based network devices of the plurality of peer-to-peer packet-based network devices;
wherein each peer-to-peer packet-based network device that hosts at least one service of the plurality of services announces availability of the at least one service to other peer-to-peer packet-based network devices of the plurality of peer-to-peer packet-based network devices,
wherein for a given service of said plurality of services, the given service is dynamically load balanced across more than one peer-to-peer packet-based network device hosting the given service, and
wherein services are allocated to particular peer-to-peer packet-based network devices as a function of statistical information gathered regarding the peer-to-peer packet-based network devices.

2. The peer-to-peer network of claim 1 in which services include at least one of a group consisting of audio prompts, dialing service, conference mixer, billing collector, time synchronization master, multicast redirector, security administer, assigning and maintaining information pertaining to backup network devices, feature-key licensing, shared remote data storage, and external paging speaker.

3. The peer-to-peer network of claim 1, wherein at least one peer-to-peer packet-based network device of the plurality of interconnected peer-to-peer packet-based network devices is adapted to locate a particular service in the peer-to-peer network resulting from announcements received from other peer-to-peer packet-based network devices of the plurality of peer-to-peer packet-based network devices that hosts the particular services.

4. The peer-to-peer network of claim 1, wherein at least one peer-to-peer packet-based network device of the plurality of interconnected peer-to-peer packet-based network devices is adapted to request acquisition of a respective service in the peer-to-peer network subsequent to locating the respective service.

5. The peer-to-peer network of claim 1, wherein each peer-to-peer packet-based network device comprises:
at least one application adapted to request and use a service of the plurality of services supplied by a service module to perform a task;
for each service, a respective service module adapted to maintain a list of locations of the service in the peer-to-peer network and adapted to supply the service from either a local source or a remote source; and
a service manager adapted to manage interaction between the at least one application and at least one service module.

6. The peer-to-peer network of claim 5, wherein each service module comprises a client component adapted to request acquisition of a respective service, either locally or remotely, that is requested by the at least one application.

7. The peer-to-peer network of claim 5, wherein if a peer-to-peer packet-based network device of the plurality peer-to-peer packet-based network devices hosts a particular service, the service module comprises a hosting service provider component, the hosting service provider component adapted to supply the at least one application with the requested service.

8. The peer-to-peer network of claim 5, wherein each peer-to-peer packet-based network device comprises a client component for each service available to the peer-to-peer packet-based network device and a hosting service provider component for each service hosted by the peer-to-peer packet-based network device;
wherein the client component is adapted to request acquisition of a respective service, either locally or remotely, that is requested by the at least one application and the hosting service provider component is adapted to supply the at least one application with the requested service.

9. The peer-to-peer network of claim 1, wherein each peer-to-peer packet-based network device maintains statistical information regarding the services in the peer-to-peer network.

10. The peer-to-peer network of claim 9, wherein services are allocated to particular peer-to-peer packet-based network devices as a function of the statistical information gathered regarding peer-to-peer packet-based network devices.

11. The peer-to-peer network of claim 1, wherein at least one of the plurality of interconnected peer-to-peer packet-based network devices is at least one of a group consisting of an interface for connecting peer-to-peer packet-based network devices to a public switched telephone network (PSTN), an interface for connecting peer-to-peer packet-based network devices to a packet-based network, and a network data storage device.

12. A method in a peer-to-peer network comprising a plurality of peer-to-peer packet-based network devices for collectively implementing services in a distributed manner, the method comprising:
announcing an available service hosted by a first peer-to-peer packet-based network device to other peer-to-peer packet-based network devices of the plurality of peer-to-peer packet-based network devices;
maintaining a list of services residing in the plurality of peer-to-peer packet-based network devices;
requesting acquisition of a respective service from one of the plurality of peer-to-peer packet-based network devices, the selected peer-to-peer packet-based network device being selected based on the maintained list;
maintaining statistical information regarding the services in the peer-to-peer network; and
allocating services to particular peer-to-peer packet-based network devices as a function of the statistical information gathered regarding peer-to-peer packet-based network devices.

13. The method of claim 12, wherein the peer-to-peer packet-based network device periodically updates an announcement of the available service to the other peer-to-peer packet-based network devices of the plurality of peer-to-peer packet-based network devices.

14. The method of claim 12, wherein announcing an available service further comprises a step of registering the available service with the peer-to-peer packet-based network device.

15. The method of claim 14, further comprising a step of the peer-to-peer packet-based network device updating a list of services to include the registered available service.

16. The method of claim 12, wherein announcing an available service further comprises a step of the peer-to-peer packet-based network device sending an announcement of the available service to the other peer-to-peer packet-based network devices of the plurality of peer-to-peer packet-based network devices.

17. The method of claim 12, wherein maintaining statistical information regarding the services is statistical information regarding the services hosted by the particular peer-to-peer packet-based network device.

18. The method of claim 12, wherein maintaining statistical information regarding the services is statistical information regarding the services requested by the peer-to-peer packet-based network device which must be acquired remotely.

19. The method of claim 12, further comprising a step of load balancing across more than one peer-to-peer packet-based network device hosting the given service as a function of the statistical information gathered regarding peer-to-peer packet-based network devices.

20. The method of claim 12, wherein maintaining a list further comprises the steps of:

receiving an announcement of an available service from another peer-to-peer network device of the plurality of peer-to-peer packet-based network devices;
maintaining an identification of the available service in a list of available services; and
forwarding identification and location information of the available service received in the announcement to a local service module, the service module maintaining the name and location of the available service in a list of names and locations of available services.

21. The method of claim 12, wherein requesting acquisition of a respective service comprises the steps of:
making a request for the respective service;
determining which one or more peer-to-peer packet-based network devices of the plurality of peer-to-peer packet-based network devices are hosting the respective service based on the maintained list;
contacting a peer-to-peer packet-based network device registered as hosting the respective service;
receiving a response from the service hosting peer-to-peer packet-based network device as to whether the service hosting peer-to-peer packet-based network can supply the respective service;
requesting acquisition of the respective service if the service hosting peer-to-peer packet-based network device can supply the respective service; and
if the service hosting peer-to-peer packet-based network device can not supply the respective service, contacting a different peer-to-peer packet-based network device of other peer-to-peer packet-based network devices registered as hosting the respective service until the respective service can be found to be available.

22. The method of claim 12, wherein announcing an available service further comprises a step of a hosting service provider component of the peer-to-peer packet-based network device hosting a service registering the available service with a service manager of the peer-to-peer packet-based network device.

23. The method of claim 22, further comprising a step of the service manager updating a list of services to include the registered available service.

24. The method of claim 12, wherein announcing an available service further comprises a step of a service manager of the peer-to-peer packet-based network device hosting a service sending an announcement of the available service to the other peer-to-peer packet-based network devices of the plurality of peer-to-peer packet-based network devices.

25. The method of claim 12, wherein requesting acquisition of a respective service comprises the steps of:
an application of the peer-to-peer packet-based network device making a request of a service manager of the peer-to-peer packet-based network device for the respective service;
the service manager supplying a location of a service module of the peer-to-peer packet-based network device for the respective service to the application;
the application contacting the service module to request acquisition of the respective service;
a client component of the service module determining which peer-to-peer packet-based network device of the plurality of peer-to-peer packet-based network devices is hosting the respective service based on the maintained list;
the client component contacting a hosting service provider component of a service module of a peer-to-peer packet-based network device registered as hosting the respective service;

the client component receiving a response from the hosting service provider component hosting the respective service as to whether the peer-to-peer packet-based network device registered as hosting the respective service can supply the respective service;

the client component acquiring the respective service if the peer-to-peer packet-based network device registered as hosting the respective service can supply the respective service; and if the peer-to-peer packet-based network device registered as hosting the respective service can not supply the respective service, the client component contacting a hosting service provider component of other peer-to-peer packet-based network devices registered as hosting the respective service until the respective service can be found to be available for use by the application.

26. The method of claim 25, wherein during the step of the client component contacting a hosting service provider component of a service module for the first time, the client component and the hosting service provider component are in the same service module.

27. The method of claim 25, wherein during the step of the client component contacting a hosting service provider component of a service module, the client component and the hosting service provider component are in different service modules in different peer-to-peer packet-based network devices.

28. The method of claim 12, wherein requesting acquisition of a respective service comprises the steps of:

an application of the peer-to-peer packet-based network device making a request of a service manager of the peer-to-peer packet-based network device for the respective service;

the service manager contacting the service module to request acquisition of the respective service;

a client component of the service module determining which peer-to-peer packet-based network device of the plurality of peer-to-peer packet-based network devices is hosting the respective service based on the maintained list;

the client component contacting a hosting service provider component of a service module of a peer-to-peer packet-based network device registered as hosting the respective service;

the client component receiving a response from the hosting service provider component hosting the respective service as to whether the peer-to-peer packet-based network device registered as hosting the respective service can supply the respective service;

the client component acquiring the service if the peer-to-peer packet-based network device registered as hosting the respective service can supply the respective service; and if the peer-to-peer packet-based network device registered as hosting the respective service can not supply the respective service, the client component contacting a hosting service provider component of other peer-to-peer packet-based network devices registered as hosting the respective service until the respective service can be found to be available for use by the application.

29. A computer usable medium having computer readable program code means embodied therein for collectively implementing services in a distributed manner, the computer usable medium residing in a peer-to-peer packet-based network device of a plurality of peer-to-peer packet-based network devices used to collectively implement services, the computer readable program code means comprising:

code means for announcing an available service hosted by a peer-to-peer packet-based network device to other peer-to-peer packet-based network devices of the plurality of peer-to-peer packet-based network devices;

code means for maintaining a list of services that reside in the plurality of peer-to-peer packet-based network devices;

code means for requesting acquisition of a respective service selected from one of the plurality of peer-to-peer packet-based network, the selected peer-to-peer packet-based network device being selected based on the maintained list;

code means for maintaining statistical information regarding the services in the peer-to-peer network; and code means for allocating services to particular peer-to-peer packet-based network devices as a function of the statistical information gathered regarding peer-to-peer packet-based network devices.

* * * * *